United States Patent
Zhao et al.

(10) Patent No.: US 9,090,264 B1
(45) Date of Patent: Jul. 28, 2015

(54) VISION-BASED WET ROAD SURFACE DETECTION

(71) Applicant: GM GLOBAL TECHNOLOGY OPERATIONS LLC, Detroit, MI (US)

(72) Inventors: Qingrong Zhao, Madison Heights, MI (US); Wende Zhang, Troy, MI (US); Jinsong Wang, Troy, MI (US); Bakhtiar Brian Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/302,632

(22) Filed: Jun. 12, 2014

(51) Int. Cl.
*B60W 40/06* (2012.01)
*B60T 8/1764* (2006.01)

(52) U.S. Cl.
CPC .............. *B60W 40/06* (2013.01); *B60T 8/1764* (2013.01)

(58) Field of Classification Search
CPC .............................. B60W 40/06; B60T 8/1764
USPC ........................................................... 701/36
See application file for complete search history.

(56) References Cited

U.S. PATENT DOCUMENTS

2011/0060478 A1* 3/2011 Nickolaou .................. 701/1
2014/0307247 A1* 10/2014 Zhu et al. .................. 356/4.01

OTHER PUBLICATIONS

Tomoaki Teshima, Hideo Saito, "Classification of Wet/Dry Area Based on the Mahalanobis Distance of Feature from Time Space Image Analysis", MVA 2009 IAPR Conference on Machine Vision Applications, May 20-22, 2009, Yokohama, Japan.

* cited by examiner

*Primary Examiner* — Mary Cheung
*Assistant Examiner* — Anne Mazzara

(57) ABSTRACT

A method for determining a wet road surface condition for a vehicle driving on a road. An image exterior of the vehicle is captured by an image capture device at a first and second instance of time. Potential objects and feature objects are detected on a ground surface of the road of travel at the first instance of time and the second instance of time. A determination is made whether the ground surface includes a mirror effect reflective surface based on a triangulation technique utilizing the feature points in the captured images at the first instance of time and the second instance of time. A wet driving surface indicating signal is generated in response to the determination that the ground surface includes a mirror effect reflective surface.

19 Claims, 4 Drawing Sheets

VISION-BASED WET ROAD SURFACE DETECTION

BACKGROUND OF INVENTION

An embodiment relates generally to detection of a wet road surface using mirror-effect reflective surfaces.

Precipitation on a driving surface causes several different issues for a vehicle. For example, water on a road reduces the coefficient of friction between the tires of the vehicle and the surface of the road resulting in vehicle stability issues. Typically, a system or subsystem of the vehicle senses for precipitation on the road utilizing some sensing operation which occurs when the precipitation is already negatively impacting the vehicle operation such as detecting wheel slip. Under such circumstances, the precipitation is already affecting the vehicle (e.g., wheel slip), and therefore, any reaction at this point becomes reactive. Proactive approach would be to know of the wet surface condition ahead of time as opposed in order to have such systems active which can prevent loss of control due to wet surfaces.

SUMMARY OF INVENTION

An advantage of an embodiment is the detection of water on a road using a vision-based imaging device. The technique described herein requires no excitations from the vehicle or driver for initiating a determination of whether water or precipitation is present. Rather, a virtual object is detected on a ground surface in two different images captured at different locations and a triangulation technique is applied to the virtual object for determining whether the ground surface through which the virtual object is detected has a mirror-effect reflective surface. The determination of whether the object as detected is a virtual object within a mirror-like surface or whether the object is an object on the ground surface is determined in reference to a location where the images are taken and a location where a light ray from the object to the camera intersects the ground surface.

An embodiment contemplates a method of determining a wet road surface condition for a vehicle driving on a road. An image exterior of the vehicle is captured by an image capture device at a first instance of time. A potential object is detected on a ground surface of the road of travel by a processor. A feature point is identified, by the processor, on the potential object on the ground surface of the road of travel. An image exterior of the vehicle is captured by the image capture device at a second instance of time. The potential object on the ground surface of the road of travel captured is detected at the second instance of time by the processor. The feature point is identified on the potential object of the image captured at the second instance of time by the processor. A determination is made whether the ground surface includes a mirror effect reflective surface based on a triangulation technique utilizing the feature points in the captured images at the first instance of time and the second instance of time. A wet driving surface indicating signal is generated in response to the determination that the ground surface includes a mirror effect reflective surface.

DETAILED DESCRIPTION

Figure 1A:
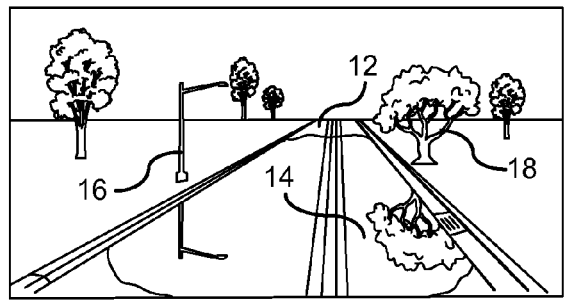
FIG. 1a is a perspective view of a scene captured by a camera of a wet surface.

There is shown in FIG. 1a, a vehicle traveling along a vehicle road 12. Precipitation 14 is shown disposed on the vehicle road 12 and is often displaced by the vehicle tires as the vehicle tires rotate over the wet vehicle road 12. It is often advantageous to know beforehand when the vehicle will be traveling along a wet vehicle road 12 so that issues resulting from precipitation, such as loss of traction or engine degradation resulting from water entering exterior air intake vents can be negated or at least mitigated.

Precipitation 14 on the vehicle road 12 can result in a reduction of traction when driving on the wet road surface. The precipitation 14 disposed on the vehicle road 12 lowers the coefficient of friction between the vehicle tires and the vehicle road 12. As a result, traction between the vehicle tires and the vehicle road 12 is lowered. Loss of traction can be mitigated by warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle.

Figure 1B:
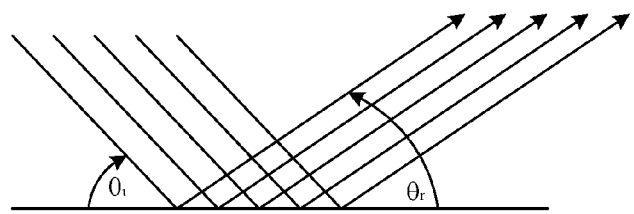
FIG. 1b is an exemplary illustration of light reflection on still water.

As shown in FIG. 1a, water is disposed on the road and objects such as a tree 16 and a light pole 18 are seen in the reflective surface generated by the precipitation 14 in the form of still water on the vehicle road 12. The still water on the vehicle road functions as a mirror-type surface that projects a reflection. A light reflection on the road surface, particularly a smooth surface where the water is still, will have an incident light angle that is substantially equal to the reflected light angle as shown in FIG. 1b. Therefore, a camera capturing an image through the reflective surface of the still water will capture light rays that have an incident light angle equal to a reflective light angle.

Figure 2A:
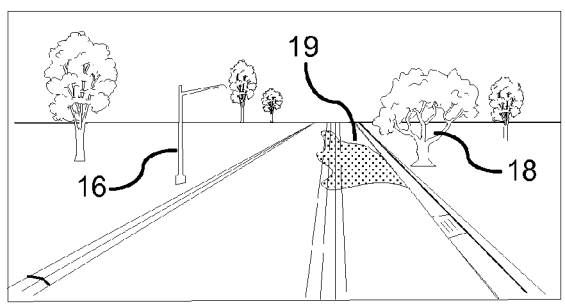
FIG. 2a is a perspective view of a scene captured by a camera of a dry surface.
Figure 2B:
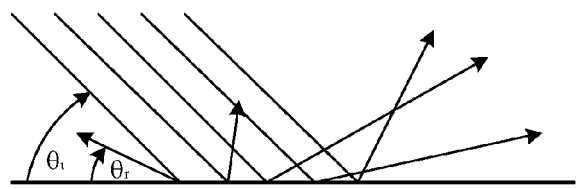
FIG. 2b is an exemplary illustration of light reflection and scattering on a dry surface.

FIG. 2a illustrates a vehicle driven on a dry road having no precipitation on the road of travel. As shown, no precipitation exists on the vehicle road 12. Shadows 19 may be cast by objects such as the tree 18; however, shadows do not generate a reflective mirror surface. As shown in FIG. 2b, the reflected light rays are diffused once the incident light rays bounce off the non-mirrored surface. As a result, the reflected light rays are scattered and the angles of reflection are not equal to the angles of incidence as shown in FIG. 1b.

Figure 3:
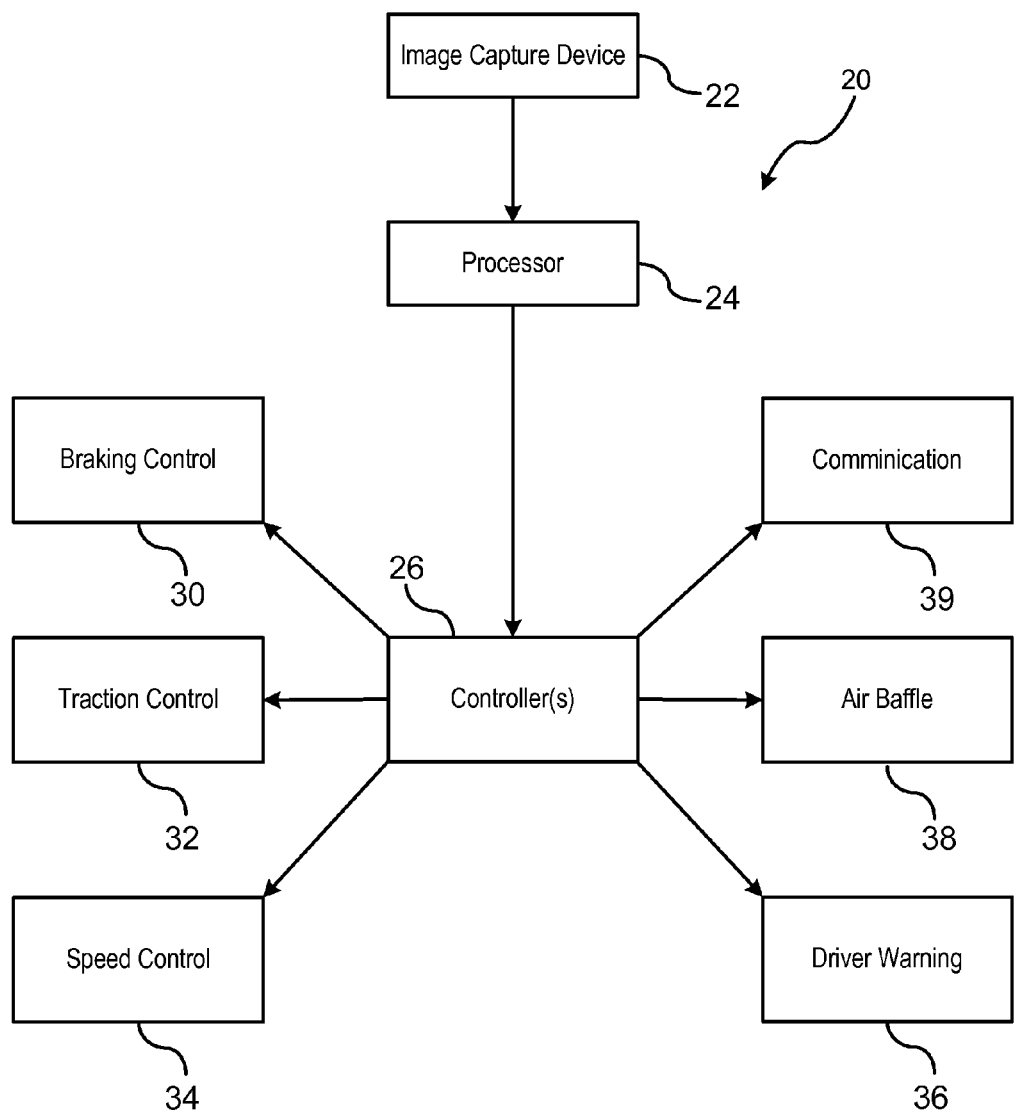
FIG. 3 illustrates a block diagram of a wet road surface detection system.

FIG. 3 illustrates a block diagram of a wet road surface detection system 20. A vehicle-based image capture device 22 is mounted on the vehicle for capturing images forward of the vehicle. The image device 22 may include, but is not limited to, a camera for capturing images of the road. The function of the image capture device 22 is to capture an image that includes objects above the road and additionally the road itself for detecting a presence of water on the road of travel. The images captured by the vehicle-based image capture device 22 are analyzed for detecting water therein.

A processor 24 processes the images captured by the image capture device 22. The processor 24 analyzes reflection properties of the road of travel for determining whether water is present on the road surface.

The processor 24 may be coupled to one or more controllers 26 for initiating or actuating a control action if precipitation is found to be on the road surface. One or more countermeasures may be actuated for mitigating the effect that the precipitation may have on the operation of the vehicle.

The controller 26 may be part of the vehicle subsystem or may be used to enable a vehicle subsystem for countering the effects of the water. For example, in response to a determination that the road is wet, the controller 26 may enable an electrical or electro-hydraulic braking system 30 where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels and brakes maintains an expected coefficient of friction between the vehicle brake actuators and the braking surface of the wheels when braking by the driver is manually applied.

The controller 26 may control a traction control system 32 which distributes power individually to each respective wheel for reducing wheel slip by a respective wheel when precipitation is detected on the road surface.

The controller 26 may control a cruise control system 34 which can deactivate cruise control or restrict the activation of cruise control when precipitation is detected on the road surface.

The controller 26 may control a driver information system 36 for providing warnings to the driver of the vehicle concerning precipitation that is detected on the vehicle road. Such a warning actuated by the controller 26 may alert the driver to the approaching precipitation on the road surface and may recommend that the driver lower the vehicle speed to a speed that is conducive to the current environmental conditions, or the controller 26 may actuate a warning to maintain a safe driving distance to the vehicle forward of the driven vehicle. It should be understood that the controller 26, as described herein, may include one or more controllers that control an individual function or may control a combination of functions.

The controller 26 may further control the actuation of automatically opening and closing air baffles 38 for preventing water ingestion into an engine of the vehicle. Under such conditions, the controller 26 automatically actuates the closing of the air baffles 38 when precipitation is detected to be present on the road surface in front of the vehicle and may re-open the air baffles when precipitation is determined to no longer be present on the road surface.

The controller 26 may further control the actuation of a wireless communication device 39 for autonomously communicating the wet pavement condition to other vehicles utilizing a vehicle-to-vehicle or vehicle-to-infrastructure communication system.

The advantage of the techniques described herein is that no excitations are required from the vehicle or driver for initiating a determination of whether water or precipitation is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water or precipitation. In contrast, the techniques described herein provide an anticipatory or look-ahead analysis so as to leave time for the driver or the vehicle to take precautionary measures prior to the vehicle reaching the location of the water or precipitation.

Figure 4:
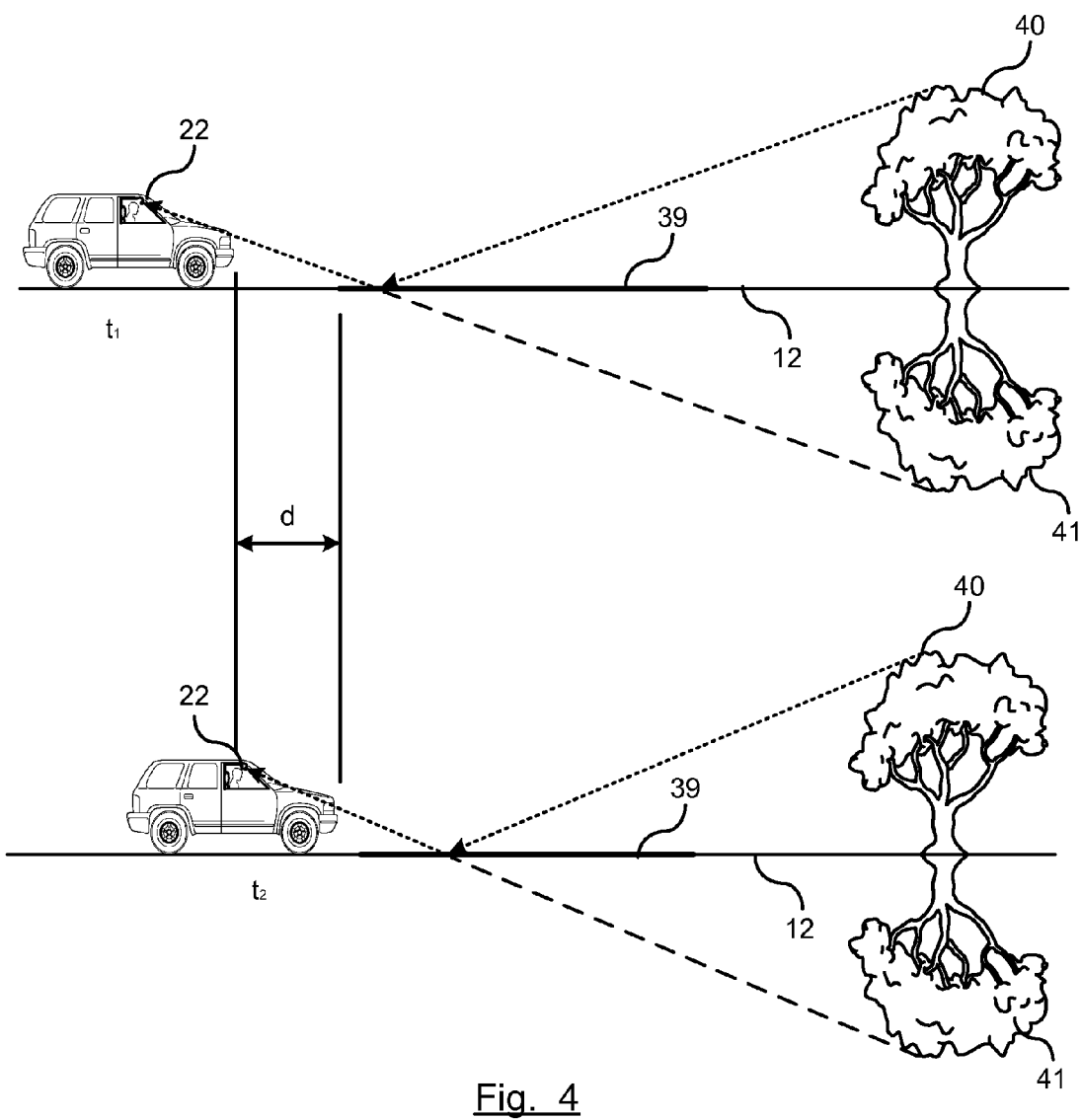
FIG. 4 is an exemplary pictorial illustration of a virtual object captured by a camera at various different instances of time.

FIG. 4 illustrates pictorial illustration of how reflective properties may be used to determine whether the water is present on the surface of the traveled road utilizing a triangulation technique between images captured at a first instance of time $t_1$ and a second instance of time $t_2$. As shown in FIG. 4, at time $t_1$ the image capture device 22 captures the road of travel 12. Still water 39 is present on the road surface and a reflection of a real object 40 is captured in the image by the image capture device 22. The still water 39 on the road functions as a mirror-type surface having reflective properties. A light reflection on the road surface for a still water surface will have an incident light angle that is substantially equal to the reflected light angle. Furthermore, the size of the real object 40 in the image will be substantially equal to the size of a virtual object 42 in the reflections. Similarly, the distance to the real object 40 will be substantially equal to the distance to the virtual object 42 in the reflection. Since the image capture device 22 is essentially capturing an image through a mirror surface, the virtual object 42 will be inverted in reference to the real object 40 when the image is viewed. As shown in FIG. 4, the object is displayed as a virtual image below the ground having substantially the same dimensions as the real object above the ground except that the object is flipped.

Figure 5:
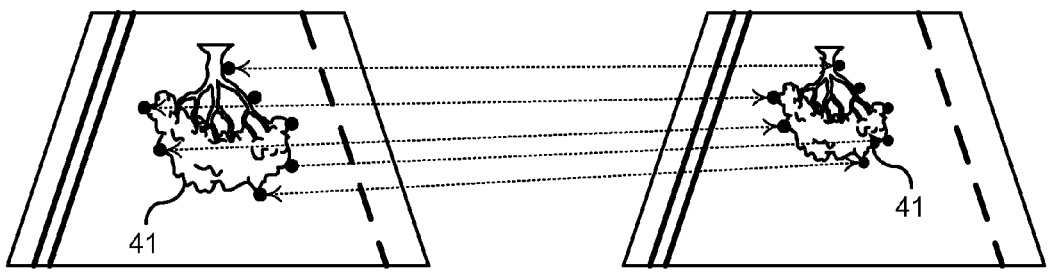
FIG. 5 is an exemplary illustration of feature points matching at two instances of time.

After the vehicle travels a duration of time, a next image is captured at time $t_2$, the captured image at time $t_2$ will include both a real object 40 and a virtual object 41 if still water is still present. Feature points of the real object 40 and the virtual object 41 are extracted from the image. If a still water reflection is present, then the features points of the object in the real portion should match with the feature points of the object in the virtual portion. Moreover, as shown in the enlarged views of FIG. 5, feature points of the virtual object 41 at time $t_1$ should match the feature points of the virtual object 42 captured at time $t_2$. To determine whether the virtual object 41 is the same, the following triangulation technique is applied to the virtual object 41 within the image. However, prior to performing the triangulation technique, a respective set of features are identified and an analysis is performed on the respective set of features to determine whether the respective features match and are therefore the same feature extracted from two separate images. Feature points matching may be performed by matching feature descriptors of the detected points at time t1 and t2. Such matching feature descriptor technique may include, but is not limited to, scale-invariant feature transform (SIFT) or speeded up robust features (SURF). The triangulation technique is to determine whether the feature point is below or above/on the ground surface. If the feature point is below ground surface, the feature point is on a virtual image reflected by wet surface. If the feature point is detected, then a determination may be made that it is likely that the feature point is reflected by a mirror like surface, such as water film on the road. If the feature point is above or on the road surface, then a determination is made that the real object point is either from above ground object or a point on road surface itself.

Figure 6:
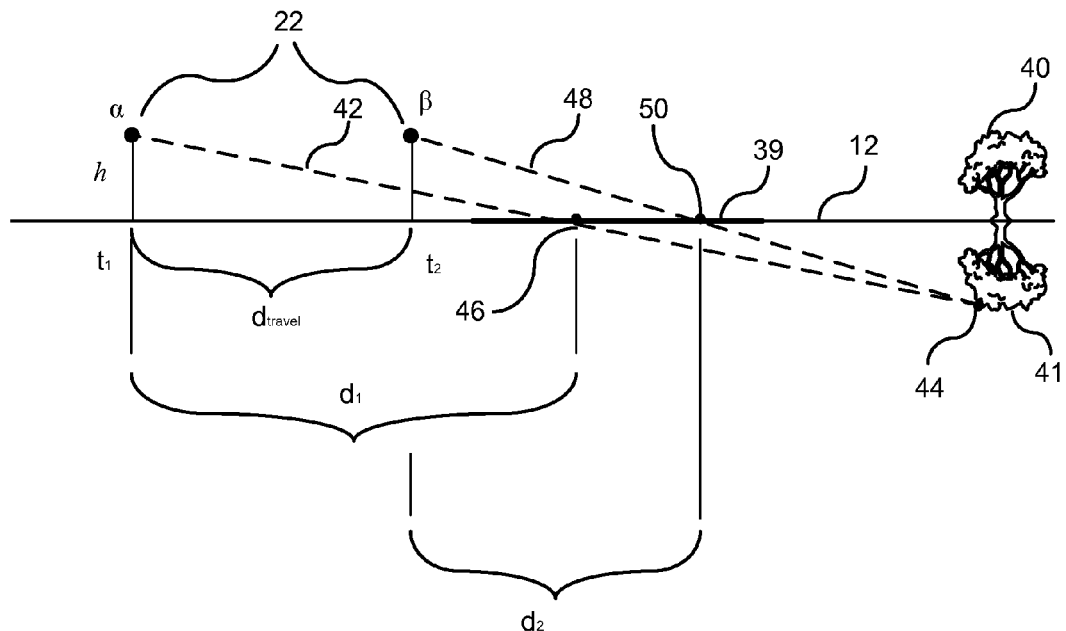
FIG. 6 is an example of a triangulation technique for a wet surface.

In FIG. 6, the triangulation technique analyzes captured scenes at two instances of time, for example $t_1$ and $t_2$. At each instance of time, the extracted feature of the virtual object 41 is analyzed. At time $t_1$, the camera is positioned at a height h above the ground. The image capture device 22 captures the virtual object 41 in the reflective image as if the object is below the ground surface. A light ray 42 is shown extending from a feature point 44 on the virtual object 41 to the lens of the image capture device 22. An angle (α) represents the angle of the light ray extending from the extracted feature point 44 and the image capture device 22, which is readily known through calibration of the imaging capture device beforehand. The light ray 42 is shown intersecting the reflective surface 39 at a reflection point 46.

As the vehicle travels a respective distance, a next image is captured at time $t_2$. At time $t_2$, the camera maintains the height position (h) above the ground surface. The image capture device 22 captures the virtual object 41 in the reflective image as if the object is below the ground surface. If a reflective still water surface is present, then the same feature point 44 is captured and identified in the image. A light ray 48 is shown extending from the same feature point 44 on the virtual object 41 to the lens of the image capture device 22 now positioned at a distance ($d_{travel}$) 1 from the original position. If the same feature point 44 is captured by the image capture device 22 on the virtual object 41, then the angle of the light ray at time $t_2$ will be different than the angle of the light ray at time $t_1$. As shown, an angle (β) represents the angle of the light ray extending between the extracted feature point 44 and the image capture device 22 at time $t_2$, which is readily known through calibration of the imaging capture device beforehand. The light ray 48 is shown intersecting the reflective surface 39 at a reflection point 50. As shown in FIG. 6, each respective light ray 42 and 48 intersects the reflective surface at different locations. Light ray 42 intersects the reflective surface at ground point 46, whereas light ray 48 intersects the light surface at ground point 50.

Since the speed of the vehicle is known as the vehicle travels from $t_1$ to $t_2$, the distance $d_{travel}$ between the points where the image is taken is calculated. A first distance $d_1$ represents the distance from the vehicle at time $t_1$ to the intersecting ground point 46. Since α and h are known, $d_1$ can be calculated based on trigonometric functions. A distance $d_2$ represents the distance from the vehicle at time $t_2$ to the ground point 50. Since β and h are known, $d_2$ can be calculated based on trigonometric functions. The following equation will hold true if the feature point captured at both instances of time $t_1$ and $t_2$ is based on a respective virtual object below the ground surface (i.e., in the reflective surface) as opposed to a point on the non-reflective ground surface:

$$d_1 - d_{travel} < d_2 \quad (1)$$

In an alternative approach, the determination of whether the feature point is below the ground surface may be determined by a feature point height $h_{pf}$. The feature point height $h_{pf}$ is determined as a function of α, β, h, $d_{travel}$ and is represented by the following formula:

$$h_{fp} = h - \frac{d_{travel}}{\cot(\alpha) - \cot(\beta)}. \quad (2)$$

If the result in eq (2) is that $h_{fp} < 0$, then a determination is made that that the feature point is below ground surface and most probably the feature point is from a virtual object reflected by a mirror-like water surface.

Figure 7:
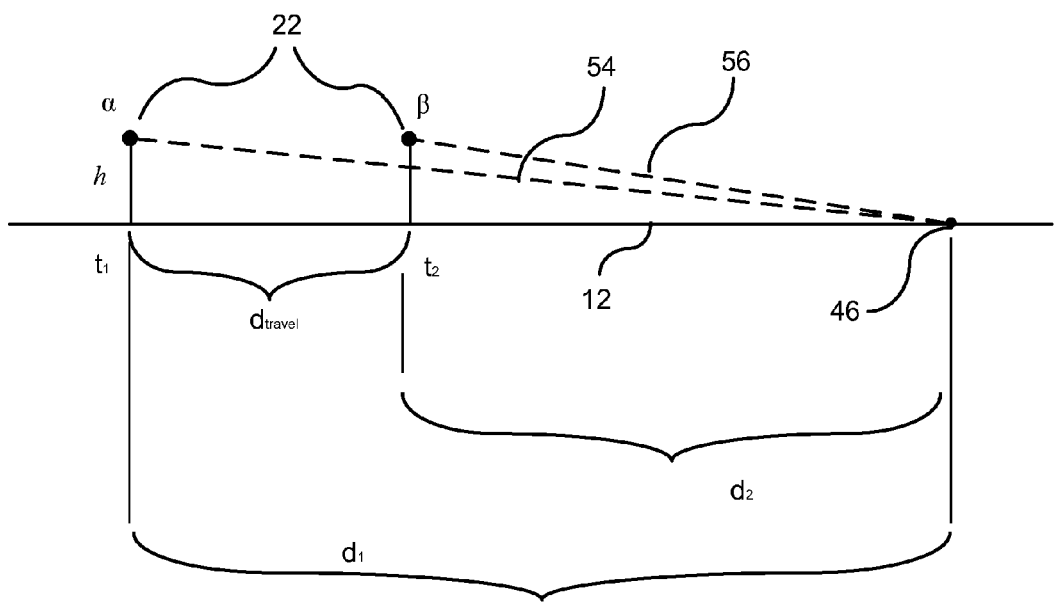
FIG. 7 is an example of a triangulation technique for a dry surface.

FIG. 7 illustrates a triangulation calculation that indicates when the extracted feature is a point on the ground surface. As shown in FIG. 7, an image is captured at $t_1$. A feature point 52 is extracted from the image. At time $t_2$, a next image is captured and the same point is identified in the image. Light ray 54 is shown extending from the camera to the extracted feature point at time $t_1$. Similarly, light ray 56 is shown extending from the camera to the extracted feature point at time $t_2$. Since the speed of the vehicle is known as the vehicle travels from $t_1$ to $t_2$, the distance $d_{travel}$ is calculated. Distance $d_1$ represents the distance from the vehicle at time $t_1$ to the feature point, which is the location that the light ray intersects the ground surface. Since α and h are known, $d_1$ can be calculated based on trigonometric functions. Distance $d_2$ represents the distance from the vehicle at time $t_2$ to the feature point 52, which is the location that the light ray intersects the ground surface. Since β and h are known, $d_2$ can be calculated based on trigonometric functions. The following equation will hold true if the feature point captured at both instances of time is based on an object on the ground (i.e., ground surface having no reflective surface) as opposed to a virtual point in the reflection:

$$d_1 - d_{travel} = d_2 \quad (3)$$

In an alternative approach, the determination of whether the feature point is above the ground surface may be determined by the result from eq (2). If the result in eq (2) is that $h_{fp} > 0$, then a determination is made that the feature point is on or above the ground surface.

Depending on the water/wet surface size and vehicle driving speed, the specular reflection effect from the mirror like water/wet surface may present in several continuous video frames. The aforementioned method is applied on each frame and a respective detection result is output for each frame. A decision making strategy could be used based on the multiple detection results from temporal multiple video frames. For example, a smoothing/averaging method or a multi-voting method may increase the detection confidence and decrease the detection error or noise.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet road surface condition for a vehicle driving on a road, the method comprising the steps of:

capturing an image exterior of the vehicle by an image capture device at a first instance of time;

detecting, by a processor, a potential object on a ground surface of the road of travel in the image captured at the first instance of time;

identifying, by the processor, a feature point on the potential object on the ground surface of the road of travel of the image captured at the first instance of time;

capturing an image exterior of the vehicle by the image capture device at a second instance of time;

detecting, by the processor, the potential object on the ground surface of the road of travel captured at the second instance of time;

identifying, by the processor, the feature point on the potential object of the image captured at the second instance of time;

determining whether the ground surface includes a mirror effect reflective surface based on a triangulation technique utilizing the feature points in the captured images at the first instance of time and the second instance of time; and generating a wet driving surface indicating signal in response to the determination that the ground surface includes a mirror effect reflective surface.

2. The method of claim 1 wherein triangulation technique utilizing the feature points in the captured images at the first instance of time and the second instance of time utilizes a line-of-sight light rays extending between the image capture device and first and second feature points.

3. The method of claim 2 wherein the triangulation technique comprises the following steps:
identifying a first location where a light ray associated with the first feature point intersects the ground surface;
identifying a second location where a light ray associated with the second feature point intersects the ground surface when the second image is captured by the image capture device;
determining whether the first location and the second location are at a same location;
wherein the ground surface is determined as including still water in response to the first location and the second location being different locations; otherwise, determining that the ground surface includes a non-still water surface.

4. The method of claim 3 wherein the determination that the first location and the second location are different locations is determined in response to the following inequality:

$$d_1 - d_{travel} < d_2$$

where $d_{travel}$ is a distance traveled by the vehicle between a time the first image is captured and a time the second image is captured, $d_1$ represents a distance from a vehicle position when the first image is captured and a location where the light ray associated with the first detected feature point intersects the ground surface, and $d_2$ represents a distance from a vehicle position when the second image is captured and a location where the light ray associated with the second feature point intersects the ground surface.

5. The method of claim 3 wherein the determination that the first location and the second location are the same location is determined in response to the following equality:

$$d_1 - d_{travel} = d_2$$

where $d_{travel}$ is a distance traveled by the vehicle between a time the first image is captured and a time the second image is captured, $d_1$ represents a distance from a vehicle position when the first image is captured and a location where the light ray associated with the first feature point intersects the ground surface, and $d_2$ represents a distance from a vehicle position when the second image is captured and a location where the light ray associated with the second feature point intersects the ground surface.

6. The method of claim 1 wherein the image capture device is positioned on the vehicle at a same height above them the ground surface when the first image and the second image is captured.

7. The method of claim 1 further comprising the steps of:
analyzing the feature point identified in the first image with the feature point identified in the second image for determining similar properties; and
performing the triangulation technique in response to the determination that the first and second feature points include similar properties and are determined to be a same point on the object.

8. The method of claim 7 wherein analyzing the feature point identified in the first image with the feature point identified in the second image for determining similar properties is performed by a scale-invariant feature transform technique.

9. The method of claim 7 wherein analyzing the feature point identified in the first image with the feature point identified in the second image for determining similar properties is performed by a speed up robust features technique.

10. The method of claim 1 wherein the wet driving surface indicating signal is used to warn a driver of water on the road surface.

11. The method of claim 1 wherein the wet driving surface indicating signal alerts a driver of a potential reduced traction between vehicle tires and the road surface.

12. The method of claim 1 wherein the wet driving surface indicating signal alerts a driver of the vehicle against a use of cruise control.

13. The method of claim 1 wherein the wet driving surface indicating signal alerts a driver to reduce a vehicle speed.

14. The method of claim 1 wherein the wet driving surface indicating signal is provided to a vehicle controller for shutting baffles on an air intake scoop of a vehicle for preventing water ingestion.

15. The method of claim 1 wherein the wet driving surface indicating signal is provided to a vehicle controller, the controller autonomously actuating vehicle braking for mitigating condensation build-up on vehicle brakes.

16. The method of claim 1 wherein the wet driving surface indicating signal is provided to a wireless communication system for alerting other vehicles of the wet road surface condition.

17. The method of claim 1 wherein multiple temporal images are analyzed for detecting whether the ground surface includes the mirror effect reflective surface for each temporal image captured, and wherein each detection result for each captured image is utilized cooperatively to generate a confidence level of whether the ground surface includes a mirror effect reflective surface.

18. The method of claim 17 wherein cooperatively utilizing each detection result to generate the confidence level is performed by averaging the detection results from the multiple temporal images.

19. The method of claim 17 wherein cooperatively utilizing each detection result to generate a confidence level is performed by a multi-voting technique of the detection results from the multiple temporal images.

* * * * *